United States Patent [19]

Shaanan et al.

[11] Patent Number: 5,708,236
[45] Date of Patent: Jan. 13, 1998

[54] WEIGHING SCALE WITH CANTILEVER BEAM FOR TRANSMITTING FORCE TO A STRAIN GAUGE

[75] Inventors: Gad Shaanan; Walter Francovich; Derek Hunziker, all of Montreal, Canada

[73] Assignee: Enlight Corporation, Taiwan

[21] Appl. No.: 496,214

[22] Filed: Jun. 28, 1995

[51] Int. Cl.$^6$ .................... G01G 21/08; G01G 3/08; G01G 3/14
[52] U.S. Cl. .................... 177/256; 177/229; 177/211
[58] Field of Search .................... 177/256, 259, 177/261, 229, 211

[56] References Cited

U.S. PATENT DOCUMENTS

| | | | |
|---|---|---|---|
| 4,429,756 | 2/1984 | Jacobson et al. | 177/211 |
| 4,458,771 | 7/1984 | Hanssen et al. | 177/256 |
| 4,800,973 | 1/1989 | Angel | 177/211 |
| 4,819,750 | 4/1989 | Carnevale | 177/256 |
| 4,844,189 | 7/1989 | Shisgal et al. | 177/211 |

*Primary Examiner*—Michael L. Gellner
*Assistant Examiner*—Michael J. Hayes
*Attorney, Agent, or Firm*—Michael D. Bednarek; Kilpatrick Stockton LLP

[57] ABSTRACT

A weighing scale comprising a housing having an upper platform for receiving a load, and a base; a lever assembly comprising a plurality of levers, each of which is in operative contact with the upper platform and supported by a post element mounted on the base. A cantilever beam is mounted on the base and positioned between the lever assembly and the base. A weight-transmitting pin is provided for supporting the lever assembly and acting on the cantilever beam for transmitting the load from the intermediate cover to the cantilever beam through the lever assembly. A strain gauge element is fixed on the cantilever beam for converting a strain developed therein into an electrical signal. An indicator responsive to the electrical signal is provided such that a displacement of the upper platform into the housing results in a corresponding movement of the levers, and exerts a force on the cantilever beam through the weight-transmitting pin to cause the strain gauge element to develop the electrical signal and causes the indicator to display a weight of the load. The arrangement of the lever assembly and weight-transmitting pin prevents variation caused by differing load positions on the upper platform.

12 Claims, 7 Drawing Sheets

WEIGHING SCALE WITH CANTILEVER BEAM FOR TRANSMITTING FORCE TO A STRAIN GAUGE

BACKGROUND OF THE INVENTION

1. Field of the Invention

The present invention relates generally to a weighing scale, and particularly to a digital platform weighing scale that is less susceptible to error caused by changes in the position of a load on the scale.

2. Description of the Prior Art

Weighing scales, especially digital weighing scales, have been part of our life for many years. Known weighing scales are usually formed with a two-part housing arranged for articulated displacement, one of the parts constituting a platform designed to receive the object or person to be weighed, and the other part constituting a remaining portion of the housing. Displacement of the platform with respect to the remaining portion of the housing, under the influence of the weight of an object located on the platform, is transmitted to a weight-sensing mechanism located within the housing. This in turn gives rise to a visible display of the weight. It will be readily appreciated that for accurate weighing variation in the load position on the platform should be as slight as possible to minimize influence on the weighing result.

Jacobson et al., in U.S. Pat. No. 4,429,756, disclose a weighing scale with a low overall height primarily for use as a bathroom weighing scale. The weighing scale receives a load to be weighed and transmits the force to a lever arrangement that converts strains due to the load into an electrical signal. The signal is then converted into a weight indication.

Shisgal et al., in U.S. Pat. No. 4,844,189, disclose another platform-type weighing scale. In this weighing scale, an upper surface of a casing constitutes a weight bearing platform, and at least three foot elements extend out of a base surface of the casing. The foot elements are capable of limited displacement in directions into and out of the casing in coordination with at least three counterbalanced, weight-transmitting levers.

Conventional platform weighing scales are unable to show the weighing result independent of the standing position of a person to be weighed. Rather, they will display different results during each weighing process due to different standing positions. Furthermore, conventional weighing scales usually have complex production procedures and high manufacturing costs.

SUMMARY OF THE INVENTION

It is therefore an object of this invention to provide a weighing scale in which the weighing result is less susceptible to variation caused by differing load positions.

It is another object of this invention to provide a weighing scale that can be assembled easily and conveniently.

Additional objects, advantages, and novel features of the invention will be set forth in the description that follows, and will become apparent to those skilled in the art upon reading this description or practicing the invention. The objects and advantages of the invention may be realized and attained by the appended claims.

To achieve these and other objects, the weighing scale of this invention comprises: a housing having an upper platform for receiving a load, and a base; an intermediate cover located between the upper platform and the base for transmitting the load from the upper platform; a lever assembly comprising a plurality of levers extending diagonally inward from the corners of the base, wherein each of the levers is placed in contact with the intermediate cover by contacting means and supported by a post element mounted on the base; a cantilever beam mounted on the base and positioned between the lever assembly and the base; a weight-transmitting pin for supporting the lever assembly and acting on the cantilever beam for transmitting the load from the intermediate cover to the cantilever beam through the lever assembly; a strain gauge element fixed on the cantilever beam for converting a strain developed therein into an electrical signal; and an indicator responsive to the electrical signal; the arrangement being such that a displacement of the upper platform into the housing results in a corresponding displacement of the intermediate cover and movement of the levers, and exerts a force on the cantilever beam through the weight-transmitting pin to cause the strain gauge element to develop the electrical signal.

The invention will now be described, by way of example, with reference to the accompanying diagrammatic drawings.

DETAILED DESCRIPTION OF THE INVENTION

Figure 1:
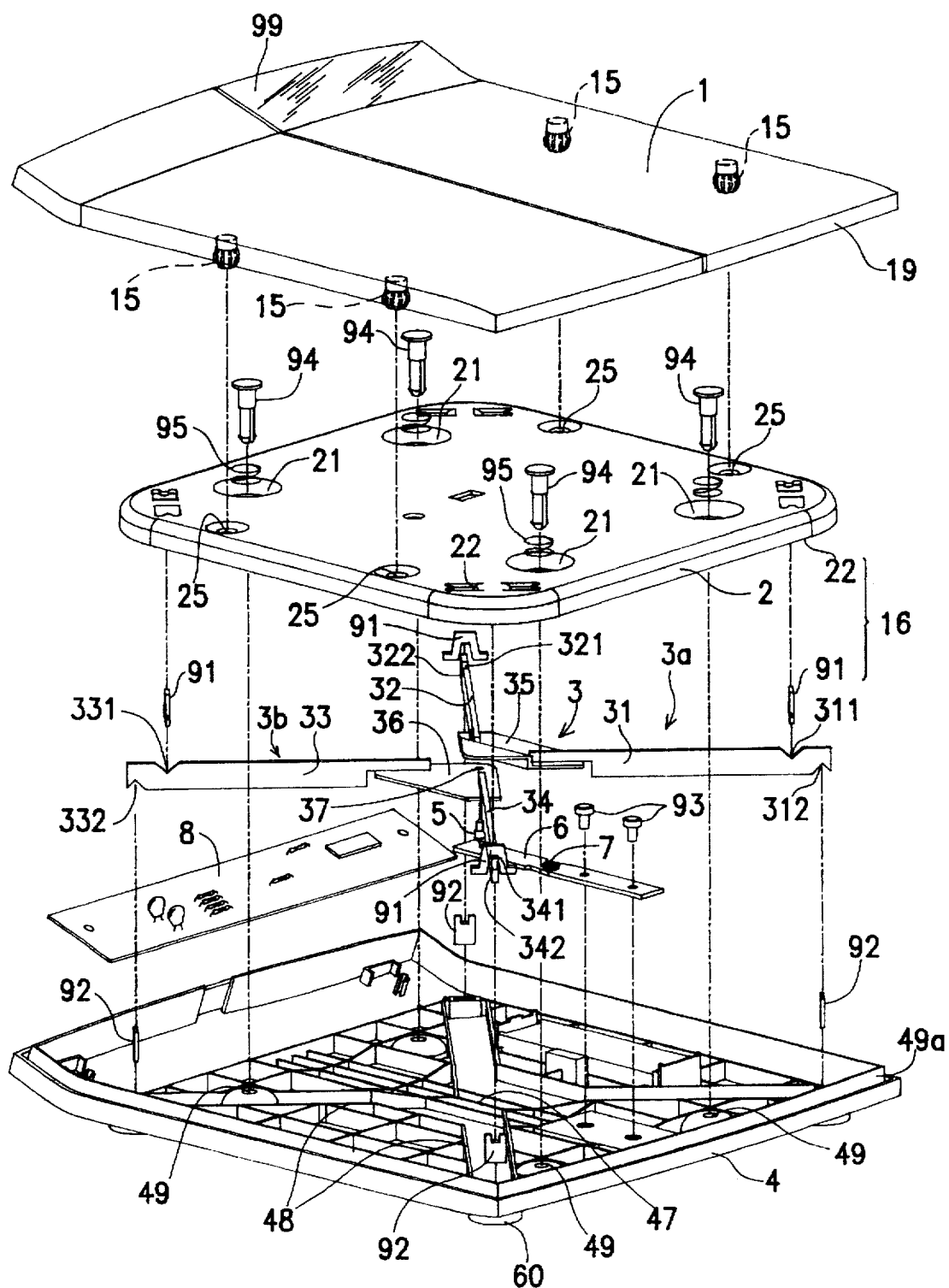
FIG. 1 is a perspective exploded view of the weighing scale according to the present invention.

As can be seen in FIG. 1, the weighing scale in accordance with the present invention comprises an upper platform 1, an intermediate cover 2, a lever assembly 3, a weight-transmitting pin 5, a cantilever beam 6, a strain gauge element 7, a signal-translation device 8, and a base 4. The upper platform 1 and the base 4, after assembling the scale, are suitably bonded together. The assembly process will be described below. Furthermore, the upper platform 1 is preferably made of plastic material.

Figure 7:
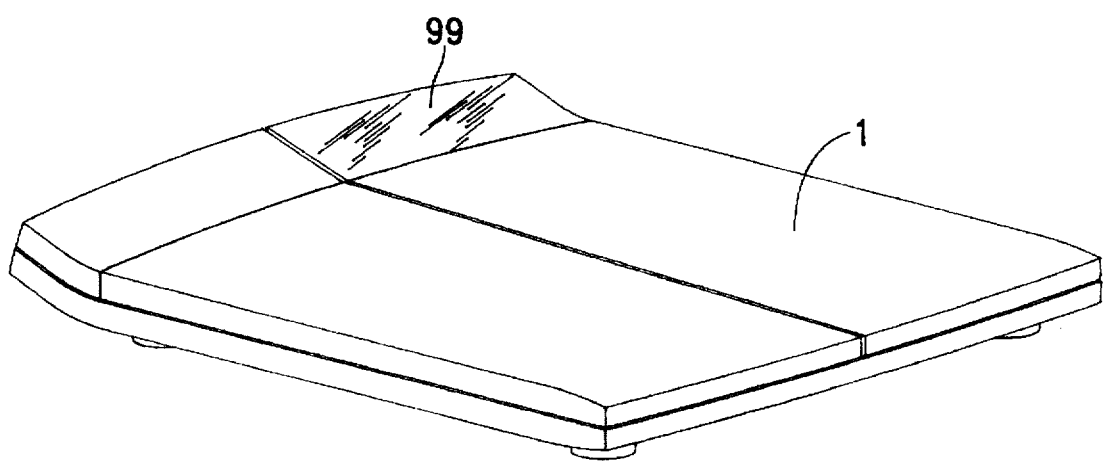
FIG. 7 is a perspective view of the assembled weighing scale according to the present invention.

The upper platform 1 and the base 4 constitute the housing of the present weighing scale. The sides 19 of the upper platform 1 extend downward and overlap the upwardly extending sides 49a of the base 4, as shown in FIGS. 1 and 7. The other elements, including the intermediate cover 2, the lever assembly 3, the weight-transmitting pin 5, the cantilever beam 6, the strain gauge element 7 and the signal-translation device 8, are assembled within the housing. The upper platform 1 is provided with a digital LCD indicator 99 showing the load of the article to be weighed. The base 4 includes a lamina net 48 thereon and has four foot elements 60 individually extending through the four corners thereof for supporting and balancing the weighing scale.

Figure 2:
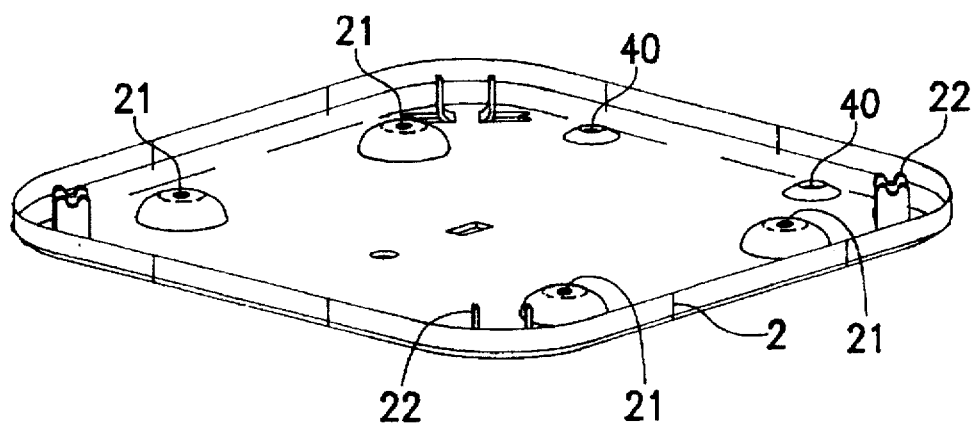
FIG. 2 is a perspective view of the reverse side of the intermediate cover of the weighing scale according to the present invention.
Figure 3:
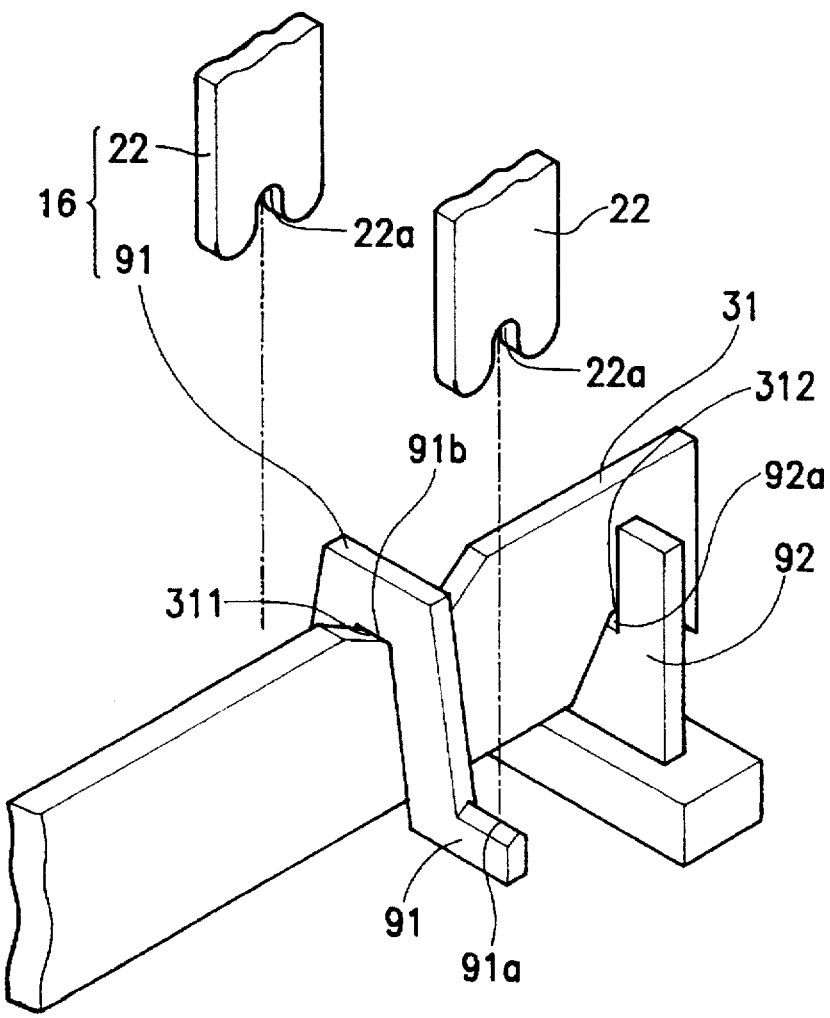
FIG. 3 is an exploded view on an enlarged scale of a detail of the lever, the load-transferring element, the leg, the post element and the assembling thereof according to the present invention.

The lever assembly 3 includes two lever subassemblies 3*a* and 3*b*. The intermediate cover 2 is positioned between the upper platform 1 and the base 4 for covering the lever subassemblies 3*a* and 3*b*, the transmitting pin 5, the cantilever beam 6, and the strain gauge element 7. The intermediate cover 2 receives a load from the weighed article or person through the upper platform 1. The intermediate cover 2 is rectangular-shaped and provided with four openings 21 for being mounted on the base 4 by four fix pins 94. The cover 2 also has four receiving orifices 25 for receiving four fixing elements 15 mounted beneath the upper platform 1. The intermediate cover 2 has four pair of legs 22 extending toward the opposite side of the upper platform 1 and being supported by four load-transferring elements 91, as shown in FIGS. 2 and 3.

Each of the lever subassemblies 3*a* and 3*b* is located between the intermediate cover 2 and the base 4. The first lever subassembly 3*a* consists of two levers 31, 32, and a first connecting plate 35, with the two levers 31 and 32 connected perpendicularly with each other by the first connecting plate 35. The second lever subassembly 3*b* also consists of two levers 33, 34 and a second connecting plate 36, with the two levers 33 and 34 connected perpendicularly with each other by the connecting plate 36. The four levers 31, 32, 33, and 34 extend diagonally inward from the corners of the base 4. The lever subassemblies 3*a* and 3*b* are supported by the weight-transmitting pin 5 and four post elements 92 located in the corner of the base 4. Each of the levers 31, 32, 33, and 34 has an upper recess 311, 321, 331, and 341, respectively, for engagement with the load-transferring element 91, and a lower recess 312, 322, 332, and 342, respectively, for engagement with the post element 92, as shown in FIGS. 1 and 3. The legs 22 are punched from the intermediate cover 2 downward. Furthermore, each of the load-transferring elements 91 and the corresponding legs 22 form a contacting means 16 for supporting the intermediate cover 2. Thus, the intermediate cover 2 is supported only by four contacting means 16.

Figure 4:
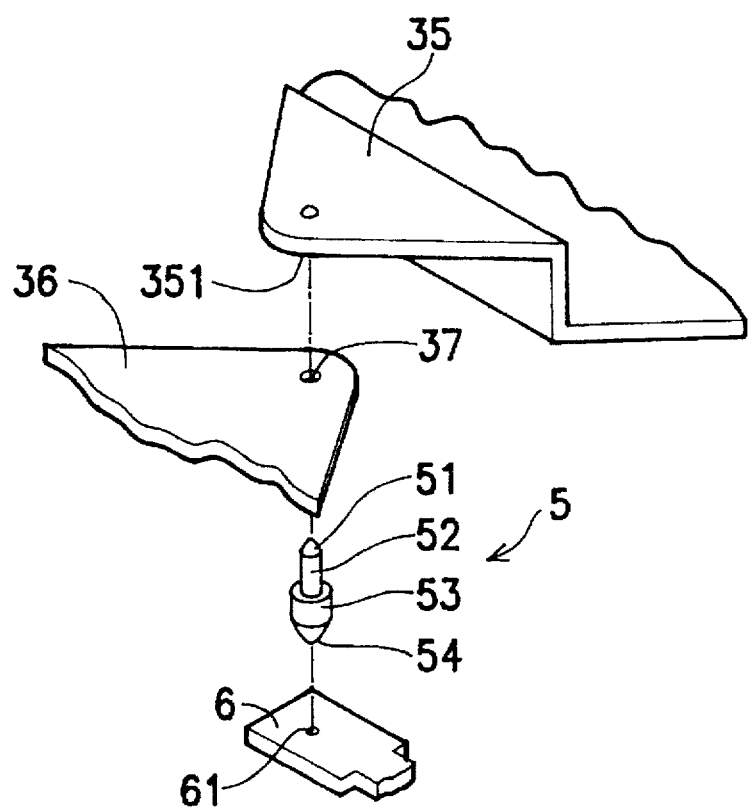
FIG. 4 is an exploded view on an enlarged scale of a detail of the connecting plates, the weight-transmitting pin and the cantilever beam according to the present invention.
Figure 5:
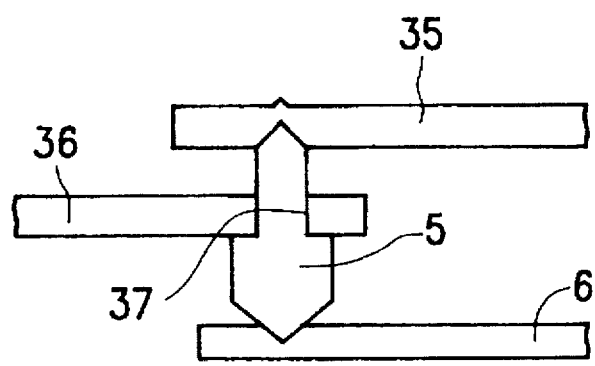
FIG. 5 is a cross-sectional view of the assembled elements shown in FIG. 4.

As seen in FIG. 4, the first connecting plate 35 end the cantilever beam 6 are respectively provided with a pit 351 and pit 61, respectively. The cantilever beam 6 is mounted on the base 4 and is horizontally elongated for receiving the load from the weight-transmitting pin 5. The connecting plates 35, 36, the weight-transmitting pin 5, and the cantilever beam 6 are so assembled that the second connecting plate 36 and the weight-transmitting pin 5 are positioned between the first connecting plate 35 and the cantilever beam 6. The weight-transmitting pin 5 is top-shaped, as shown in FIGS. 4 and 5, and is defined as an upper tip portion 51, a narrow column 52, a wide column 53 and a lower tip portion 54. The upper tip portion 51 of the weight-transmitting pin 5 is engaged with the pit 351 of the first connecting plate 35, and the lower tip portion 54 is engaged with the pit 61 of the cantilever beam 6. The narrow column 52 of the weight-transmitting pin 5 is inserted into the hole 37 of the second connecting plate 36, but the wide column 53 is obstructed from going through the hole 37 thereof. The assembled positions of the connecting plates 35, 36, the weight-transmitting pin 5, and the cantilever beam 6 can be seen in FIG. 5.

Figure 6:
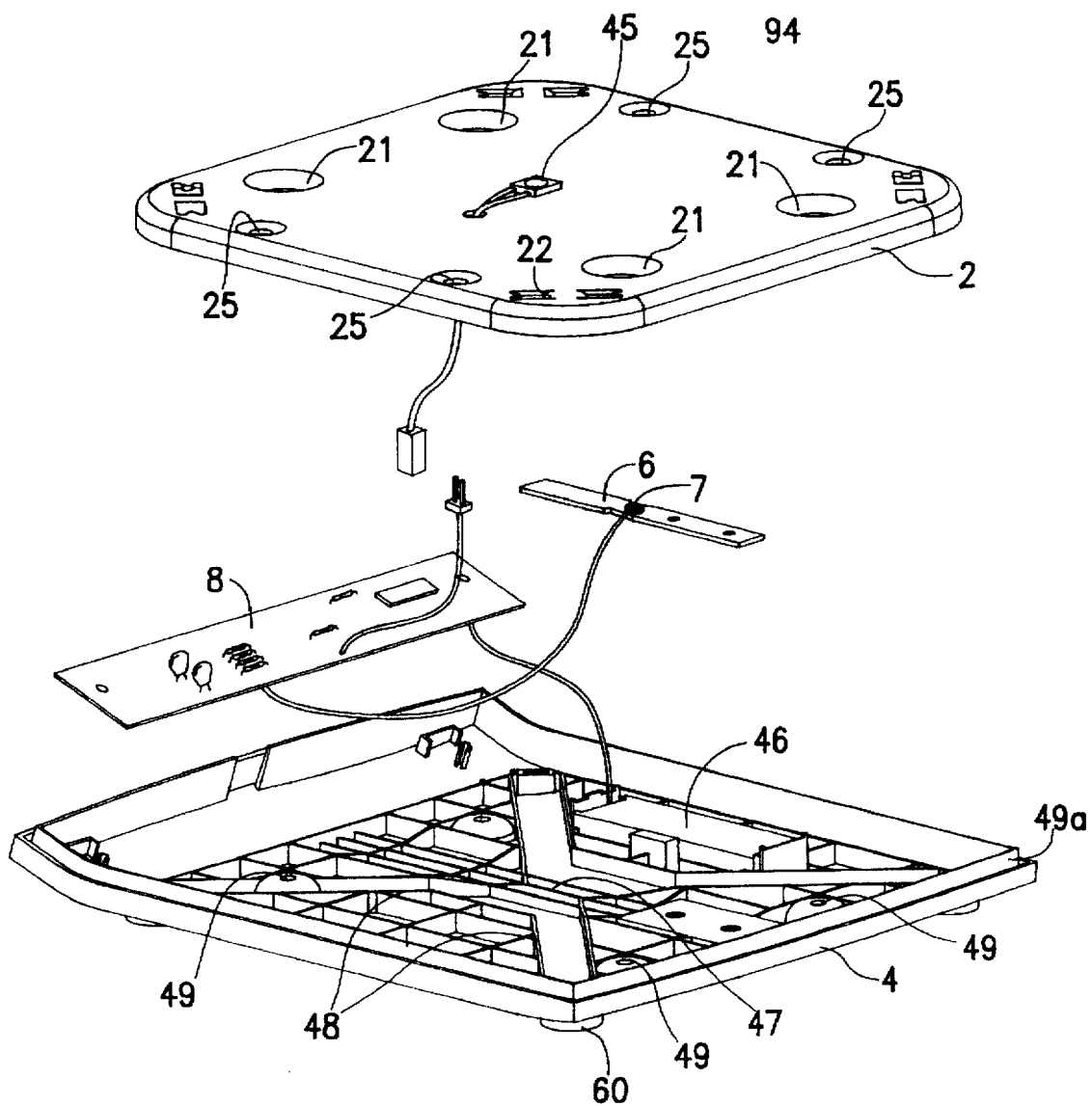
FIG. 6 is a schematic view showing the circuits of the weighing scale according to the present invention.

The signal-translation device 8 powered by a battery 46, as shown in FIG. 6, is electrically responsive to the distortion of the cantilever beam 6 due to the resistance change of the strain gauge element 7. The device 8 is electrically connected to the LCD indicator 99 to display the weighing result of the load. The signal-translation device 8 also includes a calibration-adjustment element 45 to calibrate the weighing result. The arrangement of the electrical connections is generally shown in FIG. 6.

The assembling procedure of the weighing scale will be described below. As seen in FIG. 1, the signal-translation device 8 is mounted on one side of the base 4, and the cantilever beam 6 having a strain gauge element 7 is mounted near the central portion of the base 4 by two screws 93. The signal-translation device 8 is then electrically connected to the strain gauge element 7, the battery 46, and the calibration-adjustment element 45.

The lower tip portion 54 of the weight-transmitting pin 5 is positioned into the pit 61 of the cantilever beam 6 with the central axle of both the narrow column 52 and wide column 53 being vertical to the base 4. Four post elements 92 are mounted at four corners of the base 4. The second lever subassembly 3*b* is then located on the base 4 with the guidance of the upper tip portion 51. The narrow column 52 of the weight-transmitting pin 5 is introduced into the hole 37 of the connecting plate 36. The ends of the levers 33 and 34 are supported by the post elements 92 with the post elements 92 engaged with the lower recesses 332 and 342, respectively. The levers 33 and 34 are positioned to extend diagonally inward from the corners of the base 4 along each pair of parallel plates of the lamina net 48. The parallel plates extend diagonally inward from the corners of the base 4.

After the second lever subassembly 3*b* is located in a predetermined position, the first lever subassembly 3*a* is located on the base 4 in a similar manner to the assembly of the second lever subassembly 3*b*, except that the first connecting plate 35 is positioned over the second connecting plate 36 and supported by the upper tip portion 51 of the weight-transmitting pin 5 with the weight-transmitting pin 5 being inserted into the pit 351 and against the first connecting plate 35. Four omega-shaped load-transferring elements 91 are then put onto the upper recesses 311, 321, 331, and 341 of the levers 31, 32, 33, and 34 individually.

The intermediate cover 2 is then placed over the lever subassemblies 3*a* and 3*b* to cover the lever subassemblies 3*a*, 3*b*, the weight-transmitting pin 5, the strain gauge element 7, the four post elements 92, and the lamina net 48. The intermediate cover 2 includes four pairs of legs 22 for engagement with four load-transferring elements 91 individually, with the groove 22*a* of each leg 22 supported by the supporting edges 91*a*, respectively. Each leg 22 and respective load-transferring element 91 constitute a contacting means 16 (FIG. 1). Four contacting means support the intermediate cover 2 at the corners thereof by the lever subassemblies 3*a* and 3*b*. Four fix pins 94 are then inserted through four springs 95 into the four openings 21 and then fixed into four mouths 49, respectively. The springs 95 are also inserted through the openings 21 and stopped by the base 4. The function of the springs 95 is to push the fix pins 94 upward, and the fix pins 94 will consequently push the upper platform 1 and then the upper platform 1 upward too. These can result in floating conditions of both the upper platform 1 and the intermediate cover 2 to minimize the error caused by interior stress of the weighing scale.

The upper platform 1 is then placed and fixed onto the intermediate cover 2 with four fixing elements 15 being engaged into four receiving orifices 25, respectively. The size of the upper platform 1 is somewhat larger than that of the intermediate cover 2. After the weighing scale is securely assembled, the upper platform 1 and the intermediate cover 2 do not directly contact the base 4. The sides 19 of the upper platform 2 extend downward and overlap the upwardly extending sides 49a of the base 4. The sides 49a of the base 4 also extend upwardly and overlap the downward extending sides of the intermediate cover 2.

When a load is applied onto the upper platform 1, the load is transmitted to the cantilever beam 6 through the intermediate cover 2, four pair of legs 22, four levers 31, 32, 33, 34, two connecting plates 35, 36, and the weight-transmitting pin 5 by order, in which the contacts of the lower recesses 312, 322, 332, 342 and the post elements 92 serve as fulcra for the levers 31, 32, 33, 34, respectively, and the inner ends of the levers 31, 32, 33, and 34 are all moved downward. The cantilever beam 6 is then slightly bent downward and causes the resistance of the strain gauge element 7 to change. The signal-translation device 8 can detect the change of the resistance of the strain gauge element 7 and thereafter display the weight result on the LCD indicator 99. The detailed circuit and the connection of the signal-translation device 8, the LCD indicator 99, and the strain gauge element 7 are within the skill in the art.

The base 4 further has a stop laminate 47 serving to limit the downward movement of the cantilever beam 6 and thereby to prohibit the load applied to the weighing scale from being large enough to destroy the cantilever beam 6.

When thus assembled, the entire load of a person or article to be weighed will be transferred and concentrated at the lower tip portion 54 of the weight-transmitting pin 5. If the feet of a person or another load are not positioned on the central part of the upper platform 1, the weight result is still unchanged because of the four levers 31, 32, 33, and 34 extending from the center of the weighing scale to four corners thereof and receiving the separate load therefrom.

Figure 8:
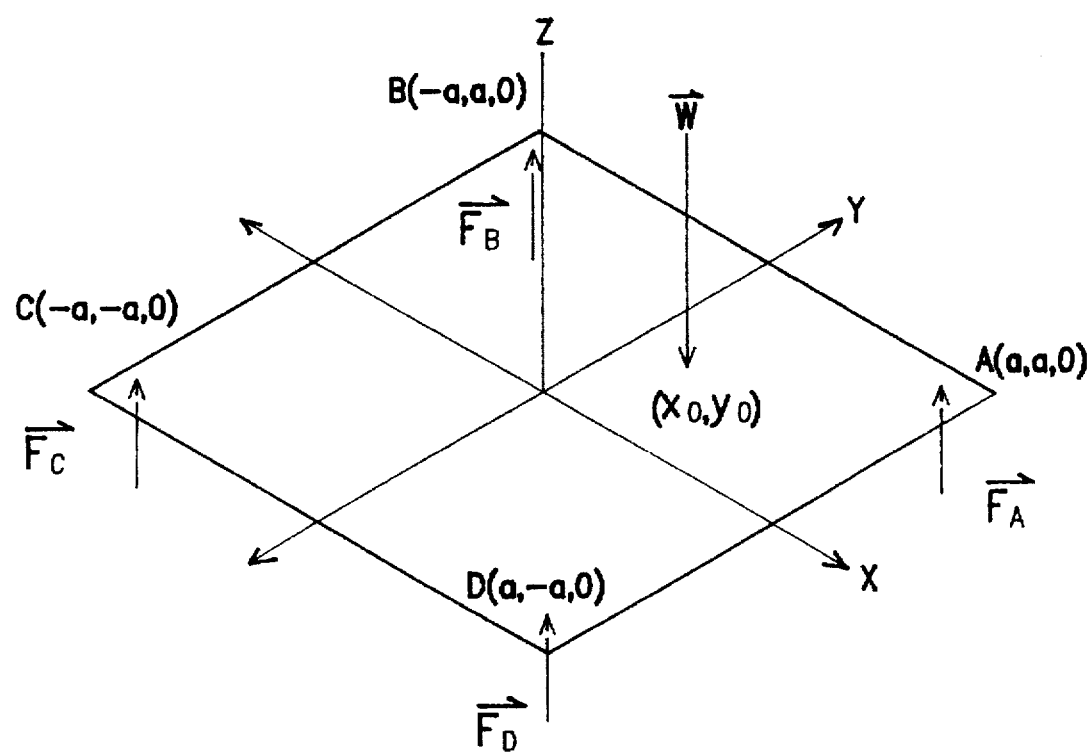
FIG. 8 is a schematic diagram showing both the action force and the reaction forces exerted on the platform 1 when coupled with the intermediate cover 2.

The principle of this function can be understood clearly with the following simplified calculation and demonstration. However, this calculation and demonstration are merely outlined. As seen in FIG. 8, the load applied to the upper platform 1 coupled with intermediate cover 2 of the weighing scale can be regarded as a vertical action force $\vec{W}$, exerted on a square plate at a point $(x_0, y_0)$. As the load and the reaction forces are in equilibrium in the weighing scale, four reaction forces $\vec{F}_A$, $\vec{F}_B$, $\vec{F}_C$, and $\vec{F}_D$ are exerted in an opposite direction of the action force $\vec{W}$, at four exerting points A, B, C, and D (the contact point of the upper recess and the post element), respectively. The relationship between the action force $\vec{W}$ and the reaction forces $\vec{F}_A$, $\vec{F}_B$, $\vec{F}_C$, and $\vec{F}_D$ is as follows:

$$\vec{W} + \sum_n \vec{F}_n = \vec{W} + \vec{F}_A + \vec{F}_B + \vec{F}_C + \vec{F}_D = 0$$

wherein $\vec{W} = -W\hat{k} = (0,0,-W)$; $\vec{F}_A = F_A\hat{k} = (0,0,F_A)$; $\vec{F}_B = F_B\hat{k} = (0,0,F_B)$; $\vec{F}_C = F_C\hat{k} = (0,0,F_C)$; and $\vec{F}_D = F_D\hat{k} = (0,0,F_D)$.

Thus, it can be inferred that $$W = F_A + F_B + F_C + F_D \tag{1}$$

Figure 9:
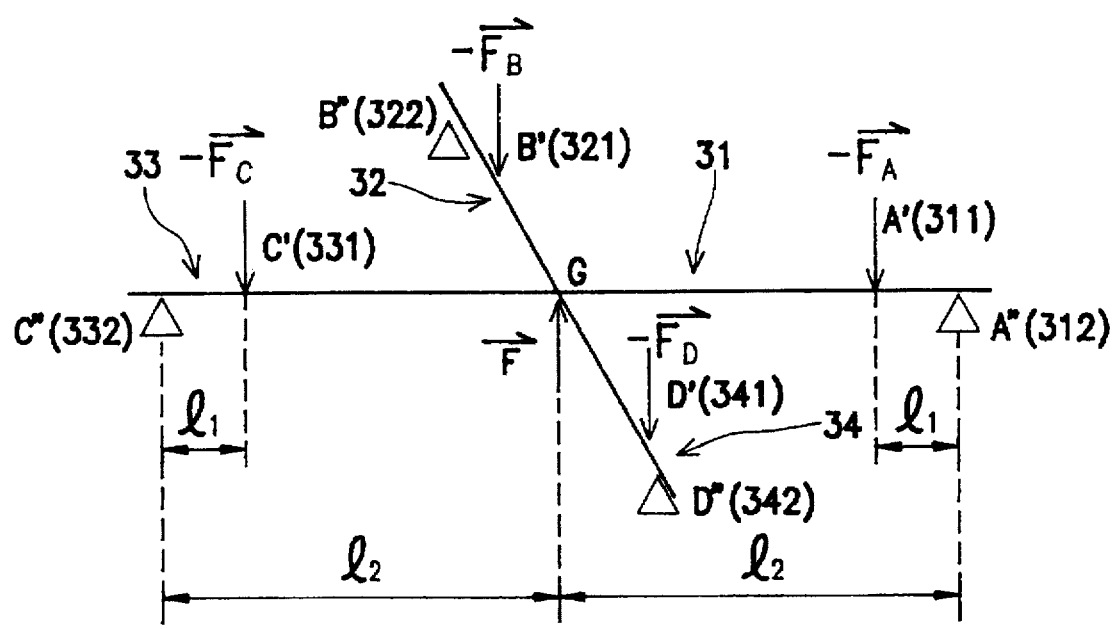
FIG. 9 is a schematic diagram of the fulcra of the levers and the exerting forces thereof.

These four reaction forces will exert another four action forces $-\vec{F}_A$, $-\vec{F}_B$, $-\vec{F}_C$, and $-\vec{F}_D$ on the four levers 31, 32, 33, and 34 through the four load-transferring elements 91 at the upper recesses 311, 321, 331, 341 of the levers, respectively. The forces exerted on these four levers will concentrate at a point G (lower tip portion 54 of the weight-transmitting pin 5), and a reaction force $\vec{F}$ will be exerted. The levers 31 and 33 are aligned in a straight line and are shown schematically in FIG. 9. The two lower recesses 312, 332 of the levers can be regarded as two fulcra A" and C". The other pair of levers 32 and 34 are also aligned as a straight line, and the lower recesses 322, 342 are regarded as two fulcra B" and D".

Because the distance between the lower recess 312 (A"), 322 (B"), 332 (C"), and 342 (D") of the levers 31, 32, 33, and 34 and the weight-transmitting pin 5 (G) are respectively equal ($l_2$), and the distance between the upper recesses 311 (A'), 321 (B'), 331 (C'), and 341 (D') of the levers and the lower recesses 312 (A"), 322 (B"), 332 (C"), 342 (D") are respectively the same ($l_1$), the calculation process can be simplified. Since the weighing scale is in equilibrium, the relationship between the forces $\vec{F}_A$, $\vec{F}_B$, $\vec{F}_C$, $\vec{F}_D$ and the $\vec{F}$ can thus be obtained from the equation $$\sum_n \vec{\tau}_n = \sum_n \vec{r}_n \times \vec{F}_n = 0$$

wherein $\vec{r}_A = a\hat{i} + a\hat{j} = (a,a,0)$; $\vec{r}_B = -a\hat{i} + a\hat{j} = (-a,a,0)$; $\vec{r}_C = -a\hat{i} - a\hat{j} = (-a,-a,0)$; $\vec{r}_D = a\hat{i} - a\hat{j} = (a,-a,0)$; and $\vec{r}_w = x_0\hat{i} + y_0\hat{j} = (x_0, y_0, 0)$. Therefore, $$F = \frac{l_1}{l_2}(F_A + F_B + F_C + F_D) \tag{2}$$

wherein $l_1(\overline{A'A''}, \overline{B'B''}, \overline{C'C''}, \overline{D'D''})$ is the distance between the upper recesses of the levers and the lower recesses (fulcra) thereof, and $l_2(\overline{A''G}, \overline{B''G}, \overline{C''G}, \overline{D''G})$ is the distance between the upper recesses of the lever and the weight-transmitting pin 5 (G).

By combining equations (1) and (2), an equation $$F = \frac{l_1}{l_2} W$$

independent of $(x_0, y_0)$ can be obtained. From this equation, it will be understood that the weighing result of the weighing scale according to the present invention is independent of the position to be loaded.

The basic structure and functions of a preferred embodiment of the weighing scale of the present invention are shown above. However, if required, some modification can also be performed on this invention. For example, temperature compensation may be provided in the signal-translation device 8. Several suitable temperature-compensation techniques are known in the art.

The cantilever beam 6 may have configurations other than rectangular, such as circular, triangular, or other polygonal configurations.

Instead of the strain gauge element 7 described above, other elements that may be electrically responsive to strain can also be used, such as crystal or semiconductor gauge elements.

Furthermore, instead of arranging one strain gauge element to detect the strain, alternatively, two or more strain gauge elements can be utilized. Also, the strain gauge element 7 may be arranged on either the top or the bottom surface of the cantilever beam 6, or on both surfaces.

As seen in FIG. 3, the contact between the notch 92a of the post element 92 and the lower recess 312 of the lever 31, the groove 91b of the omega-shaped load transforming element 91, and the upper recess 311 may be a knife edge and V-groove contact, as is common in the weighing scale art. The knife edge may be on either part and the V-groove on the other part. The contact between the supporting edge 91a of the load-transferring element 91 and the groove 22a of the leg 22 may also be a knife edge and V-groove contact. The other three contacting means 16 may also be contacted in this manner.

From the above description, one skilled in the art can easily ascertain the essential characteristics of the present invention, and without departing from the spirit and scope thereof, can make various changes and modifications of the invention to adapt it to various usages and conditions. Thus, other embodiments also fall within the scope of the following claims.

What is claimed is:

1. A weighing scale, comprising:
    a housing having an upper platform for receiving a load, and a base,
    a lever assembly comprising of a plurality of levers, each of which is in contact with said upper platform by contracting means and supposed by a post element mounted on said base, the lever assembly further comprising a first connecting plate and a second connecting plate, each connecting plate connecting at least two levers to one another;
    an intermediate cover located between the upper platform and the lever assembly;
    a cantilever beam mounted on said base and positioned between said lever assembly and said base;
    a weight-transmitting pin for supporting said lever assembly and acting on said cantilever beam for transmitting said load from said intermediate cover to said cantilever beam through said lever assembly;
    a strain gauge element fixed on said cantilever beam for converting a strain developed in said beam into an electrical signal; and
    an indicator responsive to said electrical signal;
    the arrangement being such that a displacement of said upper platform toward said base results in a corresponding movement of said levers, and exerts a force on said cantilever beam through said weight-transmitting pin to cause the strain gauge element to develop said electrical signal wherein one of said connecting plates has a hole for receiving said weight-transmitting pin, and the other connecting plate and said cantilever beam each have a pit for receiving a respective end of said weight-transmitting pin.

2. The weighing scale as claimed in claim 1, wherein said lever assembly comprises two lever subassemblies, each of which consist of one of said connecting plates and two levers extending diagonally inward from respective corners of said base, said levers being connected by said connecting plate.

3. The weighing scale as claimed in claim 2, wherein each of said levers is provided with an upper recess and a lower recess near outer ends of the lever for engagement with said contacting means and said post element, respectively.

4. The weighing scale as claimed in claim 3, wherein each of said contacting means comprises an omega-shaped load-transferring element and a pair of legs mounted beneath said intermediate cover for engaging said load-transferring element.

5. The weighing scale as claimed in claim 1, wherein each of said post elements is located on a respective corner of said base.

6. The weighing scale as claimed in claim 1, wherein the intermediate cover located between said upper platform and said lever assembly transmits load from said upper platform to said lever assembly.

7. The weighing scale as claimed in claim 6, wherein said intermediate cover is coupled with said upper platform.

8. The weighing scale as claimed in claim 6, further comprising four fix pins for fixing said intermediate cover to said base.

9. A weighing scale, comprising:
    a housing having an upper platform for receiving a load, and a base;
    an intermediate cover located between said upper platform and said base for transmitting said load from said upper platform;
    a lever assembly comprising a plurality of levers extending diagonally inward from respective corners of said base, each of said levers being in contact with said intermediate cover by contacting means and supported by a respective post element mounted on said base, the lever assembly further comprising a first connecting plate and a second connecting plate, each connecting plate connecting at least two levers to one another;
    a cantilever bean mounted on said base and positioned between said lever assembly and said base;
    a weight-transmitting pin for supporting said lever assembly and acting on said cantilever beam for transmitting said load from said intermediate cover to said cantilever beam through said lever assembly;
    a strain gauge element fixed on said cantilever beam for converting a strain developed in said beam into an electrical signal; and
    an indicator responsive to said electrical signal;
    the arrangement being such that a displacement of said upper platform toward said base results in a corresponding displacement of said intermediate cover and movement of said levers, and exerts a force on said cantilever beam through said weight-transmitting pin to cause the strain gauge element to develop said electrical signal wherein said weight-transmitting pin comprises a lower tip portion in engagement with said cantilever beam, a wide column extending upwardly from said lower tip portion and supporting the second connecting plate, a narrow column extending upwardly from said wide column through a hole in said second connecting plate, and an upper tip portion for supporting said first connecting plate.

10. The weighing scale as claimed in claim 9, wherein each of said contacting means contacts a respective lever at a point between the respective post element and the weight-transmitting pin.

11. The weighing scale as claimed in claim 10, wherein said contacting means each comprises an omega-shaped load-transferring element in contact with a recess in one of said levers.

12. The weighing scale as claimed in claim 11, further comprising a respective pair of legs mounted to and extending downward from each corner of said intermediate cover, said legs each having a recess for engaging said load-transferring element.

* * * * *